United States Patent [19]

Nnadi et al.

[11] 3,888,773
[45] June 10, 1975

[54] NITROGEN COMPOUNDS LINKED TO A HETEROCYCLIC RING AS MULTIFUNCTIONAL ADDITIVES IN FUEL AND LUBRICANT COMPOSITIONS

[75] Inventors: John C. Nnadi, Glassboro; Israel Joel Heilweil, Princeton, both of N.J.

[73] Assignee: Mobil Oil Corporation, New York, N.Y.

[22] Filed: Apr. 27, 1972

[21] Appl. No.: 248,226

[52] U.S. Cl. .................. 252/37.2; 44/63; 44/67; 44/72; 252/25; 252/40.7; 252/42.1; 252/49.7; 252/42.7; 252/50; 252/51.5 A; 252/51.5 R
[51] Int. Cl. ....... C10m 1/24; C10m 1/32; C10l 1/14
[58] Field of Search... 252/51.5 R, 50, 49.9, 51.5 A, 252/75, 77, 37.2, 42.7, 49.7; 44/63, 67, 72

[56] References Cited
UNITED STATES PATENTS

| | | | |
|---|---|---|---|
| 3,250,708 | 5/1966 | Dazzi et al. | 252/50 X |
| 3,278,436 | 10/1966 | Dazzi et al. | 252/50 X |
| 3,325,496 | 6/1967 | Critchley et al. | 252/50 X |
| 3,347,645 | 10/1967 | Pietsch et al | 252/51.5 A X |
| 3,373,112 | 3/1968 | Anderson et al. | 252/50 X |
| 3,378,490 | 4/1968 | Hotten | 252/50 X |
| 3,711,404 | 6/1973 | Redmore | 252/49.9 |

Primary Examiner—Delbert E. Gantz
Assistant Examiner—Andrew H. Metz
Attorney, Agent, or Firm—Charles A. Huggett; Raymond W. Barclay; Stanley A. Strober

[57] ABSTRACT

As a new class of multifunctional additives for industrial fluids, the compounds having the following general formula (a)

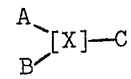

and (b)

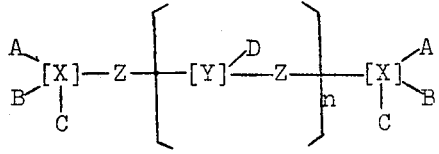

in which each X and Y represents a heterocyclic nitrogen radical and may be the same or difficult for each occurrence of X and Y; Z is a basic nitrogen-containing radical; n is 0 or an integer of at least 1, preferably 1 to 10; and A, B, C, and D are linked groups derived from compounds which may provide desired functions, such as detergent, antioxidant, and antiwear properties, or indirectly useful functions, such as adsorbency. At least one of A, B, C, or D is amino or anilino or is derived from an alkenylsuccinimide or an alkyl lactam or tetrahydropyrrolidine, or alkyl-substituted Mannich base, having at least 8 carbon atoms in the alkenyl or alkyl radical, or combinations of any of these. When X is triazine in the (a)-type molecule, at least one of A, B, or C is amino or anilino. One method of preparing these novel additives is to react a halogenated heterocyclic nitrogen compound with an alkenylsuccinimide or a Mannich base or an alkyllactam or pyrrolidine of a polyamine.

4 Claims, No Drawings

NITROGEN COMPOUNDS LINKED TO A HETEROCYCLIC RING AS MULTIFUNCTIONAL ADDITIVES IN FUEL AND LUBRICANT COMPOSITIONS

BACKGROUND OF THE INVENTION

1. Field of the Invention

This invention relates to novel additives for compositions and, in particular, it relates to hydrocarbon fluid compositions containing interlinked multifunctional additives.

2. Description of the Prior Art

In the U.S. Pat. Nos. 3,172,892 and 3,219,666 there are disclosed ashless additives derived from succinic acid compounds and polyamines; U.S. Pat. No. 3,024,195 discloses lubricating oil compositions containing alkenylsuccinimide N-alkylpiperazine; U.S. Pat. No. 3,200,076 discloses compounds of an alkenylsuccinic compound and a polypiperazinyl alkylene; and U.S. Pat. No. 3,455,386 describes polypropenylsuccinimide derivatives. U.S. Pat. No. 3,368,972 describes the preparation of Mannich bases. The compounds mentioned in these patents do not contain interlinked molecules. Although they have known utility as ashless detergents, they may not be effective, for example in lubricating oils for engines operating at high termperatures and pressures for long periods of time.

In U.S. Pat. Nos. 3,278,436 of Dazzi et al., 3,374,173 of Critchley et al. and 3,424,683 of Dazzi et al. there are disclosed triazine and pyrimidine compounds. However, none of these patents discloses the linking of long chain or polymeric radicals to the heterocyclic groups.

U.S. Pat. No. 3,623,985 discloses tris succinimides bonded to a triazine nucleus. The resulting compounds are stated to have detergent properties. These tri-succinimido substituted triazines are not the same compounds as the tri-succinimido pyrimidines, nor the di-succinimido-amino-pyrimidines and triazines, nor the multiple substituted-triazines or pyrimidines of this invention.

SUMMARY OF THE INVENTION

A novel class of multifunctional additives for industrial solids and fluids are those in which one or more nitrogen-containing substituents are interlinked through basic nitrogen atoms to a heterocyclic nitrogen compound, the molecule containing from one to three occurrences of the bond group

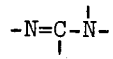

per heterocyclic ring in which the

portion represents part of the heterocyclic group, and the

portion represents the bond between the said heterocyclic group and the nitrogen atom of an amino or anilino group or their derivatives or a group derived from an alkenylsuccinimide or an alkyl or alkenyl lactam or tetrahydropyrrolidine, or a Mannich base; provided that when three such

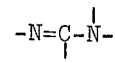

bond groups occur in the heterocyclic ring, at least one

portion is amino or anilino or other non-succinimide.

DESCRIPTION OF SPECIFIC EMBODIMENTS

The additives of this invention have either of the following structures:

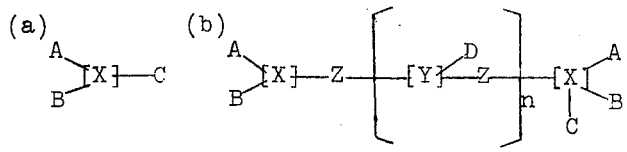

in which X and Y are each a heterocyclic radical derived from pyridine, diazine, (pyridazine, pyrimidine, pyrazine) or triazine, and may be the same or different in (b); Z is a divalent radical derived from ammonia, an amine, or a diamine, or higher polyamine; $n$ is either 0 or an integer of at least 1, and preferably 1 to 10; and A, B, C, and D may each be hydrogen or alkyl, aralkyl, alkenyl, aryl, alkaryl, hydroxyalkyl, hydroxyaryl, carboxy, alkylcarboxy, hydroxy, phosphono, phosphato, sulfonato, mercapto or a nitrogen-containing substituent, the organic groups of A, B, C, and D having from 1 to about 500 carbon atoms, and preferably from 1 to about 100 carbon atoms; provided that at least one of A, B, C, or D is one of the nitrogen-containing substituents. Thus the said groups may be of lower molecular weight, such as methyl, ethyl, propyl, decyl, octadecyl, phenyl tolyl, benzyl, and the like, or derived from polymers, such as polyethylene, polypropylene, polybutene, polyvinyl, polystyrene, and the like.

Collectively, the nitrogen-containing substituents referred to herein include amino, anilino, succinimide amino, lactam amino, and the like having the formula

wherein, R and R' may each be hydrogen, alkyl, aralkyl and hydroxyalkyl, aryl, hydroxyaryl, alkaryl, or one or both of R and R' is either an alkylene polyamino radical $-(C_mH_{2m}NH)_eH$, wherein $m$ is an integer of from 1 to 3 and $e$ is an integer of at least 1 and preferably may range from 1 to about 10, or an alkenylsuccinimide alkylene amino or alkyl lactam alkylene amino or alkyl tetrahydropyrrolidine alkylene amino, such as

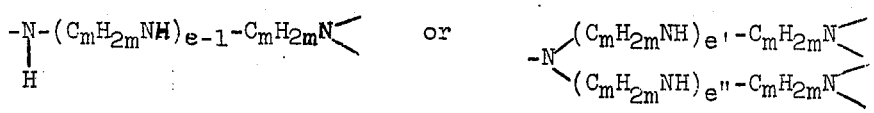

N representing succinimide, lactam or pyrrolidine groups and the sum of e' and e'' being from 0 to 10, or the alkylphenol methylene amino (i.e. Mannich bases of U.S. Pat. No. 3,368,972),

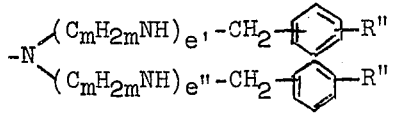

wherein R'' is preferably alkyl of at least 8 carbon atoms.

As indicated, each occurrence of X and Y in the (b)-type molecule may be the same or different, A, B, and C may be the same or different for each X group, and D may be the same or different for each n number of Y groups.

The more preferred compounds of this invention are those having the following structures:

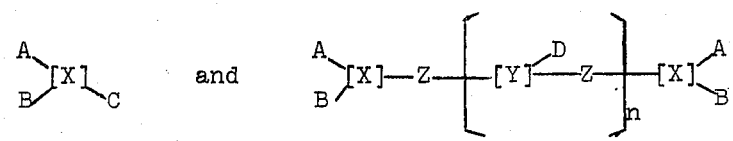

in which each X and Y is a pyridine, pyrimidine, or triazine; A, B, and C are amino, anilino, alkylamino, or alkylanilino having from 1 to more than 100 carbon atoms, e.g. imide amino, bis(imide)amino, lactam amino, or bis(lactam)amino, D may be one of these groups or hydrogen, and $n$ is 0 to 6; and Z is imino or alkylene polyamino. Preferably, at least one substituent on each X group consists of an amino group or an alkenylsuccinimide amino or bis(alkenylsuccinimide)amino group or an alkyl or alkenyl lactam or pyrrolidine amino or bis(alkyl or alkenyl lactam or pyrrolidine)amino group or an alkyl-substituted phenolmethylene amino or bis(phenolmethylene)amino group, each having at least 8 carbon atoms in each alkyl or alkenyl radical and may range to over 10,000 carbon atoms, or combinations thereof. Preferably the alkenyl and alkyl groups of these preferred substituents contain from 8 to about 300 carbon atoms, and more particularly from 20 to 200 carbon atoms.

More specifically, the compounds of this invention may be prepared generally by reacting a halogenated heterocyclic compound, such as di- or trichloropyrimidine or cyanuric chloride, with the reactants necessary to supply the desired substituents, at least one of which is a basic nitrogen compound. To produce (b)-type compounds, ammonia and primary amines, diamines and higher polyamines are used to obtain additional heterocyclic linkages. This substitution reaction is preferably carried out at a temperature between 70°C. and 250°C. over a period of from 0.5 to 15 hours. To illustrate preparation of typical compounds of this invention using a chlorinated pyrimidine as the heterocyclic compound, one of the basic nitrogen atoms of an alkenylsuccinimide amine (the terminal nitrogen atom) having the structure

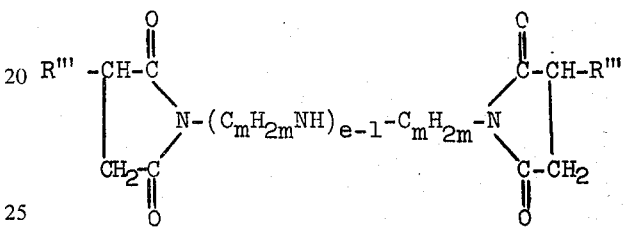

or a bis(alkenylsuccinimide)amine (one of the inner nitrogen atoms) having the structure wherein R''' is an alkenyl group, $m$ and $e$ having the aforesaid definitions, becomes linked to the pyrimidine upon evolution of hydrogen chloride. The mole ratios of the two reactants may be varied to replace all of the chlorine atoms to produce the (a)-type compound. The corresponding alkyl lactam or bis(alkyl lactam)amines and other amino or anilino substituents may be added in a similar manner. Compounds having mixed substituents, for example, a mono-amino-di-succinimideamino pyrimidine, may be obtained by varying the amine-type reactant.

In order to obtain the (b)-type additive, at least one halogen atom is left after the desired substitution reactions. The substituted monohalo heterocyclic, such as a monochloro-di-alkenylsuccinimideamino pyrimidine, is reacted with ammonia or a primary amine or preferably a polyalkylene-polyamine, $H_2N-(C_mH_{2m}NH)_eH$, such as the ethylene polyamines ($m=2$) ethylenediamine ($e=1$), diethylenetriamine ($e=2$), triethylenetetramine ($e=3$), tetraethylenepentamine ($e=4$), and the like. With a mole ratio of 2:1 of substituted pyrimidine to amine or polyamine, the reaction mixture is believed to contain the bis-(substituted pyrimidine) of the aforesaid (b)-type formula in which n is 0. If the substituted monohalo heterocyclic is reacted with a preformed diamino or di(polyamino) heterocyclic compound in a 2:1 mole ratio, the final reaction product is understood to contain a tris-cyclic compound ($n$ is 1). Alternatively, by reacting one or two different substituted heterocyclic compounds containing an amino group attached with a dihalo heterocyclic compound, mixed tris-cyclic products can be prepared.

As may be seen, a great variety of interlinked products are obtained by changing these reaction sequences or using different heterocyclic and basic nitrogen reactants as desired. By repeating the amine connections of further substituted heterocyclic compounds, even more interlinked substituents can be attached to the molecule. Thus, the resulting compounds may contain an exceedingly high molecular weight and possess excellent oil solubility, as well as additive activity. By the means of this invention additives having molecular weights of over 100,000 may be thus obtained.

In preparing the (b)-type compounds of this invention, it may be desirable to react the halogenated heterocyclic compound with one of the A, B, C, or D substituent precursors prior to reactions with the preferred polyamine providing the Z linkage, although it is not a critical requirement. For example, reaction of a trichloropyrimidine with ammonia or an amine or aniline or succinimide amine or lactam amino or pyrrolidine amine, or Mannich base compound would preferably precede reaction with with the polyamine providing the Z linkage.

In another variation of this invention, instead of reacting the halogenated heterocyclic compound with a preformed alkenylsuccinimide or alkyl lactam, the heterocyclic is reacted with a polyamine having at least 2 primary amino groups, and the resulting heterocyclic-polyamine compound is then reacted with an alkenylsuccinic anhydride or a lactone, with the removal of a mole of water per mole of anhydride or lactone. The terminal primary amino group of the polyamine, being more basic than the internal nitrogen is believed to provide the imide or lactam. If the polyamine is terminated by a secondary amino group, the resulting product would be an amine. On the other hand, reaction with a bis-alkenylsuccinimide amine or bis lactone amine reactant is believed to involve one of the inner basic nitrogen atoms. The actual structures of these final products are not entirely understood. The reaction sequence just discussed may be used for either the (a) or (b) type.

The preparation of the alkenylsuccinimide amines, alkyl lactam amines, alkyl pyrrolidine amines and alkyl-substituted Mannich bases is not part of this invention. The succinimides may be prepared by reactions first between olefins and maleic anhydride, followed by reaction of the product with amines, as described, for example, in U.S. Pat. No. 3,172,892. Lactam amines can be prepared by the reaction between lactones and amines and the removal of water to yield the cyclic product. Tetrahydropyrrolidines are prepared by the reduction of succinimides and lactams or by other known means. The Mannich bases may be prepared by the reaction of an alkylphenol, an aldehyde and an amine, as described in U.S. Pat. No. 3,368,972.

The novel reaction product of this invention may be further treated by washing with water and/or metal basic solutions. We have found that residual quantities of metal in the final product have no harmful effect in the functioning of the product in the industrial fluid. In fact, the presence of from about 0.005% to about 5% by weight of metal, such as alkali or alkaline earth metals, e.g., sodium, potassium, lithium, calcium, barium, magnesium, strontium, or zinc, nickel or manganese in these products could be beneficial; and hence, it may be just as desirable, although not necessary, to add the metal, in the form of hydroxide, oxide, carbonates, carboxylate, alcoholate, or phenolate, or other base-contributing material to the reaction product purposely.

The effectiveness of the compounds of this invention is believed to involve the presence of interlinked high molecular weight or polymeric compounds. The presence of additional substituents such as amino, alkylamino, anilino and the like provide chemisorptive stable "anchor" groups in the polymeric structure. These groups are believed to permit strong adsorption to solid surfaces with which an industrial fluid medium may come in contact, including even particles suspended in the medium, giving these additives not only improved functionality but also greater stability at elevated temperatures. It has been found that detergent properties are enhanced by the interlinked structures of this invention. Moreover, antioxidant properties assist the fluid medium in resisting high temperature deposit formation. These additives are also seen to provide a certain amount of antiwear properties and they have sufficient water and acid solubility to avert breakdown of the performance of the organic fluid. The additives of this invention may be used alone or in combination with other known additives usually used in formulation of industrial fluids.

The following examples are presented for the purpose of illustrating the preferred embodiments of this invention and are not considered to be a limitation of the scope thereof. The products produced in these examples are analyzed by gel permeation chromatography using Waters Associates Permeation Chromatograph, Model 200 operated at room temperature in benzene as solvent, using 50/80A, 80/100A (2), 350/700A, and 700/2000A columns. The procedure has been described in literature as for example, Journal of Chemical Ed., Volume 43, Page A567 (1966).

In these examples the essential ingredient may be referred to by structure or by name. The naming or depicting of these products is for convenience only in describing the type of molecule believed to be produced.

EXAMPLE 1

In a suitable reactor equipped with an agitator and condenser were added 18.2 grams (0.1 mole) of 2,4,6-trichloropyrimidine and 52 grams (0.2 mole) of dodecylaniline. The mixture was heated to 150° to 180° C. for 90 minutes during which period hydrogen chloride evolution ceased.

To the di(dodecylanilino)chloropyrimidine was added 20 grams (0.1 mole) of tetraethylenepentamine. The reaction mixture was heated to a temperature of 190° to 210° C. for 3 hours, then 135 grams (0.1 mole) polybutenylsuccinic anhydride, obtained by reacting a polybutene having a molecular weight of 1,350 with maleic anhydride, was added. The reaction mixture was stirred at 150° to 180° C. for 5 hours, during which time water condenses out. The reaction was stopped after 1½ hours at 150° C. under house vacuum and nitrogen atmosphere after water condensation ceased.

The yield of final reaction product was 170 grams containing a compound having the presumed structure

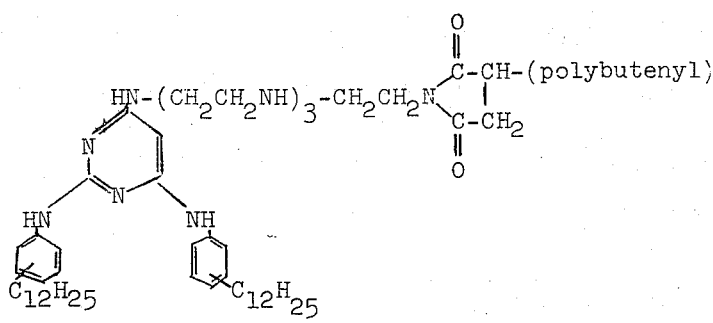

The reaction mixture is also understood to contain a minor amount of the corresponding half amide.
Anal: Calc'd for: %N, about 5.
Found: %N, 4.25

EXAMPLE 2

To the same apparatus used in Example 1 were added 30 grams (0.165 mole) of 2,4,6-trichloropyrimidine and 970 grams (0.35 mole) of the bis-polybutenyl succinimide of tetraethylene pentamine, the polybutenyl groups having about 900 molecular weight. The reaction mixture was heated at 150° to 180° C. for 7 hours, cooled and dissolved in 1500 cc toluene and washed twice with 200 cc of 12.5% NaOH solution and twice with 250 cc distilled water; n-butanol was used to break emulsion during the washes. The washed material was distilled to 150° C. under vacuum and nitrogen for 2 hours. The yield of final reaction product was 940 grams (96% theoretical), a major component of which is believed to be 2,4,6-tri-substituted pyrimidine, the substituent obtained from the bis-succinimide reactant.
Anal: Calc'd for: %N, 2.2; %basic N, 1.1; %Cl, 0.
Found: %N, 2.26; %basic N, 0.97; %Cl, 0.17

EXAMPLE 3

To a reactor were added 8.5 grams (0.05 mole) of 2-amino-4,6-dichloropyrimidine and 300 grams (0.1 mole) of the bis-polybutenylsuccinimide of Example 2. The reaction mixture was heated at 200° to 220° C. for 6 hours during which hydrogen chloride evolved. The resulting reaction mixture was treated as in Example 2. The yield of the remaining reaction product, believed to contain primarily the corresponding 2,4-di-substituted-6-aminopyrimidine, was 270 grams (96% of theoretical); this reaction product has the following analysis:
Anal: Calc'd for: %N, 2.6; %basic N, 1.2; %Cl, 0.
Found: %N, 2.36; %basic N, 0.98; %Cl, 0.15

EXAMPLE 4

In a reactor similar to that of Example 1, 32 grams (0.2 mole) of a 2-amino-4,6-dichloropyrimidine was reacted with 550 grams (0.2 mole) of the bis-polybutenylsuccinimide of Example 2 at 170° C. for 2 hours. To the resulting product was added 20 grams (0.1 mole) of tetraethylene pentamine, and the mixture heated at 175° to 180° C. for a period of 5 hours. The reaction mixture was treated in the same manner as in Example 2. The yield of reaction product, containing primarily bis-substituted-pyrimidinylamine of the (b) type (in which n is 0, A is -NH₂ and B is derived from the bis-succinimide), was 565 grams (over 96% of theory). The product has the following analysis.
Anal: Cal'd for: %N, 3.6; %basic N, 2.2; %Cl, 0.
Found: %N, 3.23; %basic N, 1.34; %Cl, 0.32

EXAMPLE 5

Using the same procedure as in Example 3, one mole of aminodichloro triazine, made by reacting cyanuric chloride with ammonia gas, is reacted with 2 moles of the bis-polybutenylsuccinimide reactant of Example 2. The resulting product, consisting primarily of an aminotriazine bearing two succinimide amino substituents, is obtained in the yield of 96% theoretical and has the following analysis:
Anal: Calc'd for: %N, 2.61; %basic N, 1.2.
Found: %N, 2.20; %basic N, 0.81

EXAMPLE 6

Using a similar procedure and reaction conditions as Example 5, one mole of aminodichlorotriazine is reacted with 3 moles of a bis-polybutenylsuccinimide of tetraethylenepentamine, in which the polybutenyl group is derived from polybutene having a molecular weight of 1,300. The substituted triazine yield is 95% theoretical and has the following analysis:
Anal: Calc'd for: %N, 3.5.
Found: %N, 3.3

EXAMPLE 7

In a suitable reactor, 8 grams of 2-amino-4,6-dichloropyrimidine (0.05 mole) were mixed with 75 grams of a process oil (a solvent-refined mineral oil) and 140 grams of bis-polybutenyl succinimide, (0.05 mole, molecular weight of polybutene being about 900) and heated at 160° to 170° C. for 5 hours. The 4 grams (0.025 mole) of 2,6-diaminopyridine was added and heating continued at 170° to 180° for 16 hours. The product was processed as described in Example 2. The final product yield is 215 grams or 95% theory and essentially having the structure believed to be

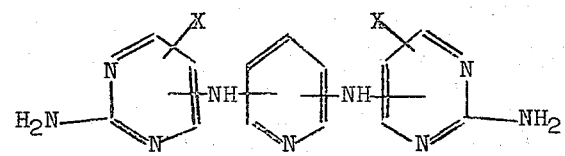

wherein X = bis(polybutenylsuccinimido)amino
Calc: %N, 2.3; %basic N, 0.75; %Cl, 0.
Found: %N, 2.48; %basic N, 0.64; %Cl, 0.02

EXAMPLE 8

Using the same procedure as in Example 2, 1 mole of 2,4,6-trichloropyrimidine is mixed with 3 moles of bis-(alkyl-lactam) of tetraethylenene pentamine, wherein the alkyl groups are polybutyl groups having a molecular weight of about 900. The resulting product is believed to contain the corresponding tri-substituted pyrimidine.

EXAMPLE 9

Using the same procedure as in Example 2, 1 mole of 2-amino-4,6-dichloropyrimidine is reacted with 2 moles of the Mannich base (prepared by reacting a polypropylphenol having a molecular weight of about 900; tetraethylene pentamine and formaldehyde in a mole ratio of 2:1:2 respectively). The resulting product is believed to contain the corresponding aminopyrimidine disubstituted with the Mannich base.

It should be noted that the reaction products of this invention as illustrated by the above examples may have one or more heterocyclic nitrogen compounds having utility. The structures or nomenclature used herein are believed to be representative of the major component. There are also believed to be other components, which may not be susceptible to identification, present in the final reaction product and which also provide desired useful functions.

EVALUATION OF PRODUCTS

The additives of this invention are tested in a series of tests to indicate their utility in lubricating oils.

1. The sulfuric acid and pyruvic acid tests indicative of detergent properties are described in U.S. Pat. No. 3,368,972. The test oil consists of a blend of solvent refined mineral oils (SUV at 210° F. of 64.1) 1% by weight of a zinc dialkyl phosphorodithioate. To the oil is added 3% by weight of a compound of this invention. In the sulfuric acid test, the lower the result the better the additive. In the pyruvic acid test, the higher the result the better the additive. The following results are obtained:

| Test Oil | Sulfuric Acid Test | Pyruvic Acid Test (%) |
|---|---|---|
| Alone | 0.102 | 58.6 |
| Example 1 Product | 0.002 | 99.6 |
| Example 2 Product | 0.006 | 99.9 |
| Example 3 Product | 0.004 | 99.9 |
| Example 4 Product | 0.004 | 99.9 |

2. The compounds of this invention have also been tested as lubricant additives in oxidation stability or antioxidant tests. The test procedure consists of mixing air, flowing at a controlled rate, with a second controlled flow stream of nitrogen oxides and sulfurdioxide in a mixing tank. The gas mixture is saturated with water by passing it through a fritted glass bubbler and then through a pre-heater. The heated stream is introduced into a reactor at a controlled rate. Samples of test oil blends (similar to that used in the previous test except the SUV at 120° F. is 86.1) containing compounds of this invention are also pre-heated and pumped into an oil reservoir of the reactor. An aluminum shaft, equipped to rotate at constant speed, is immersed in the oil reservoir while a portion thereof is exposed to the water-air-gas mixture. The shaft is maintained at a temperature of about 575° F. Thus, the oil from the reservoir coats the shaft as it rotates and becomes exposed to the upper portion of the reaction chamber filled with air and oil vapor as a thin film. The duration of the test is 70 minutes.

The rating of this test is based on the amount of oil oxidation-degradation products, such as lacquer, which become deposited on the aluminum surface of the shaft. The rating is made visually by classifying the deposits as follows: 1 indicates a clean aluminum surface or extremely light deposit; 2, moderately light or iridescent surface; 3, light or golden deposit and transparent; 4, medium or brown and translucent; 5, heavy or brown and opaque; and 6, very heavy black or brown and rough. The results are:

| Oil Composition | Concentration By Weight | Rating |
|---|---|---|
| oil blend, no additive | 0 | 4.0, 4.3, 3.7 |
| bis-succinimide reactant used in Example 2 | 10% | 4.5 |
| Example 2 Product | 5% | 1.0, 1.1 |
| Example 3 Product | 5% | 1.0 |
| Example 4 Product | 5% | 1.0 |
| Example 5 Product | 6% | 1.3 |

3. An oil containing the bis-pyrimidine compound of Example 4 is tested in a standard 4-ball wear test. In this test 3 steel balls of 52–200 steel are held in place in a ball cup. A fourth ball positioned on a vertical spindle is brought into contact with the three balls and rotated against them. The force with which the fourth ball is held against the three stationary balls may be varied as desired. The test lubricant is added to the ball cup and acts as the lubricant for the rotation. At the end of the test, the steel balls are removed and investigated for wear scar. The extent of scarring represents the effectiveness of the product as an antiwear agent; little or no scarring indicates an excellent antiwear agent. In the following series of tests, loads of 40 and 60 kilograms are used for a duration of ½ hour at oil temperatures of 300°, 400°, and 550° F., and the rotational speed of the ball is 600 r.p.m. or 23.3 cm/sec. sliding speed. The oil medium is the same mineral oil blend used in the sulfuric and pyruvic acid tests. The additive concentration is 5% by weight.

| Lubricant Composition | Wear Scar Diameter (mm) 40 kilograms | | 80 kilograms | |
|---|---|---|---|---|
| | 300° | 400° | 500°F | 300°F |
| Alone | 0.745 | 0.785 | 0.895 | 0.908 |
| Example 4 Product | 0.531 | 0.690 | 0.844 | 0.807 |

4. The composition of Example 3 is tested in the Caterpillar 1-G Engine Test. The oil composition used in the test consists of the same mineral oil blend used in the sulfuric acid and pyruvic acid tests, containing 1.3% magnesium alkyl benzene sulfonate, 1.2% of a zinc dialkyl phosphorodithioate, 1.0% of barium phosphosulfonate of polypropylene and 2.5% of the product produced in Example 3. The test engine is a single cylinder, 4-cycle Caterpillar engine operated under the following conditions:

| | |
|---|---|
| Speed, r.p.m. | 1000 |
| Brake load, HP | 19.8 |
| Oil temperature, °F | 150 |
| Jacket temperature, °F | 150 |
| Fuel | Diesel fuel containing 1% sulfur |

The engine is operated for 480 hours, ratings are made periodically. These ratings consist of: piston deposits (100% is clean), lacquer demerits (0 is clean) and percent top groove packing deposits (0 is clean). The following results are obtained:

| Time, hours | 120 | 240 | 480 |
|---|---|---|---|
| Piston rating | 90.9 | 90.2 | 82 |
| Lacquer demerits | 3.7 | 4.3 | 9.6 |
| Top groove | 69.0 | 68.0 | 92.0 |

Using the same lubricant formulation but with the bis-polybutenylsuccinimide reactant of Example 3 instead of the final product, the piston rating after 120 hours is 84; after 240 hours, 68. The lacquer demerits are 9.6 and 21.4; top groove packing 35 and 51, both for 120 and 240 hours, respectively.

5. The product of Example 1 is tested in an oxidation test on an ester lubricant prepared from a pentaerythritol esterified with 5-carbon and 9-carbon carboxylic acids. The concentration of the compound is 2 percent by weight. The test oil is subjected to a stream of oxygen at temperatures of 425° C. and 450° C. in the presence of iron, copper, lead and aluminum. The test is carried on for 24 hours. The air flow rate is about 10 liters per hour. The lead sample is weighed before and after the test since lead is one of the more susceptible metals to corrosion by oxidation. The test measurements are lead loss in milligrams, neutralization number measured by ASTM D-974 (NN) and kinematic viscosity change (KV) at 210° F.

| Test Sample | NN | KV Increase Percent | Lead Loss mg |
|---|---|---|---|
| oil alone | | | |
| 425° F. | 8.25 | 422 | 13.8 |
| 450° F. | 10.15 | 1280 | 19.4 |
| oil plus Example 1 Product | | | |
| 425° F. | 0.45 | 73 | 4.4 |
| 450° F. | 1.62 | 86 | 14.4 |

6. The products of this invention are tested in hydrocarbon solution of various concentrations to determine its ability to solubilize water. This feature is of interest particularly in systems using industrial fluids in which water is likely to be present and have adverse effects on the working properties of the fluid. For the purpose of these tests, benzene or normal octane or mineral oil are used. An organic solution with the additive sample is mixed with water and agitated by shaking for a period of 24 hours. The water phase is then separated by centrifuge with at least 6,000 gravities for over ½ hour. The water content in the hydrocarbon phase is determined by Karl Fischer analysis. An oil blend similar to that of test 2, containing 5% by weight of the additive sample, is mixed with normal octane on a 1:1 basis. A sample of this blend is mixed with an equal volume of water. At the end of the agitation and separation steps, the following amounts of water determined by Karl Fischer analysis in the organic phase are:

| Additive | Percent Water By Weight | Moles Water per Mole Nitrogen |
|---|---|---|
| Example 2 Product | 1.00 | 6.2 |
| Example 3 Product | 0.41 | 2.6 |
| Succinimide Reactant of Example 2 | 0.05 | 0.18 |

This test indicates that the additive shows improved ability over a previous lubricating oil additive to solubilize water without producing emulsification of the oil or otherwise reducing its effectiveness as a lubricant.

It can thus be seen that the compounds of this invention provide a number of different useful functions for industrial fluids such as liquid lubricants and greases. These additives may also be used in fuels, automatic transmission fluids, heat exchange fluids, metal working lubricants and coolants and resins, plastics, paints, coatings, etc.

The scope of this invention in the light of the preceding description is intended to include all obvious modifications of said description except as limited in the following claims.

We claim:

1. An organic composition comprising a major proportion of an organic fluid lubricant or fuel medium and a minor proportion sufficient to provide detergent antioxidant or antiwear properties thereto of trisubstituted pyrimidine, wherein each substituent is a bis-polyalkenylsuccinimide the amine of the bis-polyalkenylsuccinimide being an alkylene polyamine of the formula $H_2N-(C_mH_{2m}NH)_eH$ wherein $m$ is 1 to 3 and $e$ is 2 to 10 and the polyalkenyl group having from 8 to about 300 carbon atoms, said substituent being linked to the pyrimidine through a basic nitrogen atom of the substituent.

2. The composition of claim 1 wherein there is added to the said substituted pyrimidine a metal compound selected from the group consisting of the hydroxide, oxide, carbonate, carboxylate and phenolate of an alkali metal, an alkaline earth metal, zinc, nickel or manganese in sufficient amount to provide from 0.005% to about 5% by weight of the said metal in the said substituted pyrimidine compound.

3. An organic composition comprising a major proportion of an organic medium selected from the group consisting of normally liquid lubricating oils, greases, fuels, transmission fluids, heat exchange fluids, metal working lubricants and coolants and a minor proportion sufficient to provide antioxidant, antiwear or detergent properties thereto of a trisubstituted pyrimidine wherein at least one substituent is a bis-polyalkenylsuccinimide, the amine of the polyalkenylsuccinimide being an alkylene polyamine of the formula $H_2N-(C_mH_{2m}NH)_eH$ wherein $m$ is 1 to 3 and $e$ is 2 to 10 and the said polyalkenyl group having from 8 to 300 carbon atoms, and the remaining substituents are $-NH_2$ groups, said substituents being linked to the pyrimidine through a basic nitrogen atom of the substituent.

4. The composition of claim 3 wherein the polyamine is tetraethylene pentamine.

* * * * *

UNITED STATES PATENT AND TRADEMARK OFFICE
CERTIFICATE OF CORRECTION

PATENT NO. : 3,888,773
DATED : June 10, 1975
INVENTOR(S) : J.C. NNADI and ISRAEL J. HEILWEIL It is certified that error appears in the above-identified patent and that said Letters Patent are hereby corrected as shown below:

Column 3, line 7   "N" should be --N$\diagup\!\!\!\diagdown$--

Column 8, line 44   "The" should be --Then--

*Signed and Sealed this*

*twenty-eight* Day of *October 1975*

[SEAL]

Attest:

RUTH C. MASON
*Attesting Officer*

C. MARSHALL DANN
*Commissioner of Patents and Trademarks*